United States Patent
Noble et al.

(10) Patent No.: US 12,194,682 B2
(45) Date of Patent: Jan. 14, 2025

(54) METHOD AND APPARATUS FOR SUPPORT REMOVAL USING DIRECTED ATOMIZED AND SEMI-ATOMIZED FLUID

(71) Applicant: PostProcess Technologies, Inc., Buffalo, NY (US)

(72) Inventors: Matthew J. Noble, Lancaster, NY (US); Nicholas Cultrara, Buffalo, NY (US); Daniel Joshua Hutchinson, Orchard Park, NY (US); Rich Caplow, Winchester, MA (US); Robert Bosinski, Buffalo, NY (US); Rowan Paris, Buffalo, NY (US); Michael Valvo, East Aurora, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 251 days.

(21) Appl. No.: 17/633,031

(22) PCT Filed: Aug. 5, 2020

(86) PCT No.: PCT/US2020/045068
§ 371 (c)(1),
(2) Date: Feb. 4, 2022

(87) PCT Pub. No.: WO2021/026274
PCT Pub. Date: Feb. 11, 2021

(65) Prior Publication Data
US 2022/0266517 A1   Aug. 25, 2022

Related U.S. Application Data

(60) Provisional application No. 62/883,419, filed on Aug. 6, 2019.

(51) Int. Cl.
*B33Y 40/20* (2020.01)
*B08B 3/02* (2006.01)
(Continued)

(52) U.S. Cl.
CPC ............. *B29C 64/35* (2017.08); *B08B 3/02* (2013.01); *B08B 3/14* (2013.01); *B22F 10/68* (2021.01);
(Continued)

(58) Field of Classification Search
CPC ... B29C 64/35; B29C 64/357; B29C 71/0009; B08B 3/02; B08B 3/14; B22F 10/68; B22F 10/70; B33Y 40/20
See application file for complete search history.

(56) References Cited

U.S. PATENT DOCUMENTS

| 4,025,363 A | 5/1977 | De Santis |
| 5,356,481 A | 10/1994 | Yoshimura et al. |

(Continued)

FOREIGN PATENT DOCUMENTS

| EP | 1332800 A1 | 8/2003 |
| WO | 2014/177823 A1 | 11/2014 |

OTHER PUBLICATIONS

EP 1759791 (Year: 2007).*
EP 3275629 (Year: 2018).*

*Primary Examiner* — Alexander Markoff
(74) *Attorney, Agent, or Firm* — Lempia Summerfield Katz LLC

(57) ABSTRACT

An apparatus and method for removing support material from and/or smoothing surfaces of an additively manufactured part (the "AM part") is disclosed. The apparatus may include a chamber, a support surface within the chamber, one or more nozzles within the chamber, a tank positioned below the nozzles, and a diverter positioned between the nozzles and the tank. The support surface may be configured to support the AM part and may have one or more openings configured to allow the fluid to pass through the opening(s). The nozzles may be configured to spray a fluid at the AM part, and the spray may be an atomized or semiatomized (Continued)

spray of the fluid. The diverter comprises an umbrella or a diverter shield and diverts sprayed fluid from directly impacting the fluid being collected in the tank, whereby foaming of the fluid in the tank is reduced.

19 Claims, 9 Drawing Sheets

(51) Int. Cl.
*B08B 3/14* (2006.01)
*B22F 10/68* (2021.01)
*B22F 10/70* (2021.01)
*B29C 64/35* (2017.01)
*B29C 64/357* (2017.01)

(52) U.S. Cl.
CPC ............ *B22F 10/70* (2021.01); *B29C 64/357* (2017.08); *B33Y 40/20* (2020.01)

(56) References Cited

U.S. PATENT DOCUMENTS

| | | |
|---|---|---|
| 10,112,344 B2 | 10/2018 | McMahon et al. |
| 11,491,724 B2* | 11/2022 | Hutchinson ............. B22F 10/40 |
| 2002/0090410 A1* | 7/2002 | Tochimoto ............ B29C 64/357 |
| | | 425/215 |
| 2007/0181169 A1* | 8/2007 | Wallace .................... B05C 3/10 |
| | | 134/61 |
| 2013/0075957 A1 | 3/2013 | Swanson et al. |
| 2013/0152521 A1* | 6/2013 | Fritz ....................... B05B 14/49 |
| | | 55/391 |
| 2019/0176403 A1* | 6/2019 | Hutchinson ............. B33Y 40/20 |
| 2019/0202126 A1* | 7/2019 | Hutchinson ............. B05B 14/40 |
| 2021/0008808 A1* | 1/2021 | Cudzilo .................... B24C 1/08 |
| 2022/0241864 A1* | 8/2022 | Noble .................... B33Y 40/20 |
| 2022/0266517 A1* | 8/2022 | Noble .................... B29C 64/35 |
| 2022/0363002 A1* | 11/2022 | Hutchinson ........... B29C 64/386 |

* cited by examiner

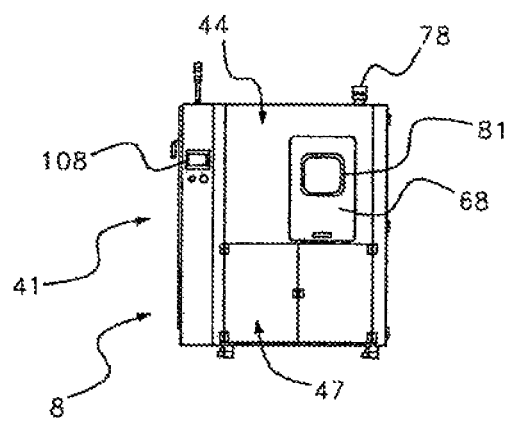
Fig. 3A
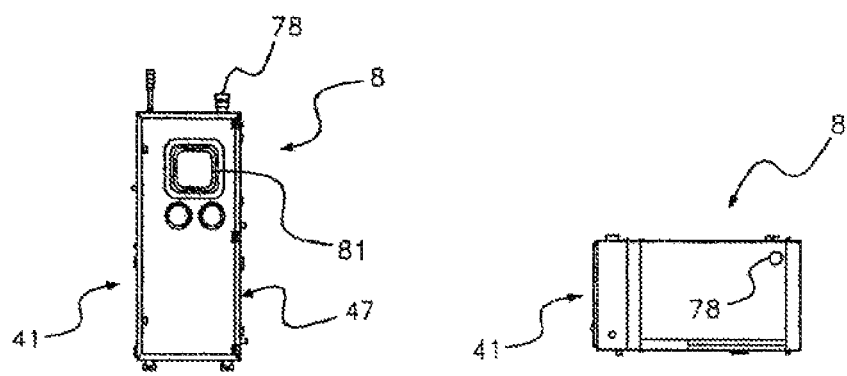
Fig. 3B
Fig. 3C

METHOD AND APPARATUS FOR SUPPORT REMOVAL USING DIRECTED ATOMIZED AND SEMI-ATOMIZED FLUID

CROSS-REFERENCE TO RELATED APPLICATIONS

This application claims priority to U.S. provisional patent application Ser. No. 62/883,419. The technology described herein is related to the technology described in Ser. No. 62/612,483 (filed on Dec. 31, 2017) and U.S. patent application Ser. No. 16/232,955 (filed Dec. 26, 2018). The entire disclosures of the foregoing three patent applications are incorporated herein by this reference.

FIELD OF THE INVENTION

This invention relates generally to a method and apparatus for removing support material from parts that have been made via additive manufacturing techniques, such as 3D printing.

BACKGROUND OF THE INVENTION

Additive manufacturing processes, such as 3D printing (e.g. Selective Laser Sintering (SLS), Stereolithography (SLA), fused deposition modeling (FDM), material jetting (MJ), electron beam (e-beam), etc.) have enabled the production of parts having complex geometries that would never be possible through traditional manufacturing techniques, such as casting, injection molding, or forging. However, additive manufacturing produces parts that require significant efforts to remove unwanted support material. The support material is needed during the manufacturing process to support portions of the part as the part is being manufactured in order to achieve complex geometries. After the manufacturing process is completed, the unwanted support material must be removed and/or rough surfaces may need to be smoothed.

The support material itself can have a complex geometry and can also be extensive. Additionally, since additive manufacturing manufactures a part in discrete layers, the surface of a part is often rough, because adjacent layers may not end in similar locations thereby leaving a rough bumpy outer surface. Such a rough outer surface is unappealing from a visual standpoint, and the uneven surface can create stress concentrations, which could develop during testing or use of the part and lead to pre-mature failure.

A current option in the additive manufacturing industry is to manually remove the support material and manually finish the surface of a part in order to produce a smooth exterior surface of the part. Depending on the type of part, using manual labor could be cost prohibitive, and could lead to excessive removal of material, an uneven surface, or both. If a surface is finished unevenly or incompletely, stress concentrations could still be unintentionally prevalent, leading to pre-mature failure of the part. In addition, manual removal of unwanted support material and manual surface finishing lacks consistency over an extended period of time and from part to part. And, such manual removal/finishing may create a bottleneck in the production process since, for example, one technician can remove support material from only a single part at a time.

Another option the additive manufacturing industry is moving toward is to use a machine, such as those providing a chemical bath, to remove support material and/or to perform surface finishing. However, such machines are limited in the type of process parameters that can be altered to tailor the process to a specific part, and also such machines require the attention of, and operation by, a technician while the machine is running, which does not completely eliminate the bottleneck issue described above. Additionally, if a technician is unaware that a machine is not set at the proper parameters, excessive material removal could occur, ruining the part.

Thus, there is a need for a method and apparatus for automatically removing support material from and smoothing the surface of parts made via additive manufacturing techniques without damaging the part itself. One such approach is to use embodiments of the present invention, which use atomized and semi-atomized fluid, chemical dissolution, and pressurized fluid. Additionally, embodiments of the present invention may provide an alternative that seeks to remove the manual labor bottleneck of processing additive manufactured parts in order to achieve surface finishing and/or support removal ("SF/SR").

SUMMARY OF THE INVENTION

The invention may be embodied as an apparatus for removing support material from and/or smoothing surfaces of an additively manufactured part (the "AM part"). The apparatus may include a chamber, a support surface within the chamber, and one or more nozzles within the chamber. The nozzles may be the same size or different sizes.

The support surface may be configured to support the AM part. The support surface may have one or more openings sized and configured to allow the fluid to pass through the opening(s). For example, the support surface may be a screen-like surface.

The nozzles may be configured to spray a fluid at the AM part, and the spray may be an atomized or semi-atomized spray of the fluid. The nozzles may be arranged in groups, each group being part of a spray header that is fed from a common supply tube. The nozzles of a particular spray-header may be the same size, but they need not be the same size. For example, the nozzles of a particular spray-header may be selected from two or more sizes.

The nozzles of one spray-header may be the same size as the nozzles of another spray-header, but the nozzles of one spray-header may be differently sized from the nozzles of another spray-header. For example, with regard to two spray-headers the nozzles of one spray-header may be selected to be of a first size, and the nozzles of the other spray-header may be selected to be of a second size.

In one embodiment of the invention, there are two spray-headers of nozzles; one above the support surface (a.k.a. "top spray-header) and one below the support surface (a.k.a. "bottom spray-header"). The top spray-header may point the nozzles to spray downward toward the AM part, and the bottom spray-header may point the nozzles to spray upward toward the AM part.

One or more valves may be included in the apparatus so that fluid can flow and spray through a first set of nozzles having one size at the same time that fluid cannot flow to spray through second nozzles of a second size. For example, nozzles of a particular spray-header may be of two or more sizes, and fluid can be made to flow through and to spray from first nozzles of one size at the same time that fluid cannot flow to spray through second nozzles of another size.

One or more of the spray-headers of nozzles may be secured to a mount that is adjustable to move the spray-header(s) nearer to or further away from the support surface. One or more of the spray-headers of nozzles may be connected directly or indirectly to an actuator for translating the spray-header(s) back and forth in a planar motion.

The apparatus may also include a tank configured to hold a volume of the fluid, and the tank may be positioned (e.g. in the chamber) to capture the fluid after the fluid is sprayed.

The apparatus may also include a heater for heating the fluid to a desired temperature. The heater may be at least partially within the tank.

The apparatus may include a ventilation system. The ventilation system may be a blower for forcing air into or pulling air out of the chamber. The ventilation system may be a vent for allowing air to leave or enter the chamber. The ventilation system may include both such a blower and such a vent.

The invention may be embodied as a method of removing support material from and/or smoothing surfaces of an AM part. Such a method may include providing a chamber, a support surface within the chamber, and one or more nozzles within the chamber. An AM part may be placed on the support surface, and a fluid may be sprayed at the AM part. The nozzles may generate an atomized or semi-atomized spray of the fluid.

The nozzles may spray at the same velocity. However, in at least one embodiment of a method according to the invention at least one of the nozzles sprays the fluid at a velocity that is different from the spray velocity created by a different one of the nozzles.

The method may be carried out so that one (or more) of the nozzles sprays the fluid at a first flow rate and one (or more) of the nozzles sprays the fluid at a second flow rate. For example, in one embodiment of a method that is in keeping with the invention a first one (or more) of nozzles sprays the fluid at a first flow rate and a second one (or more) of the nozzles sprays the fluid at a second flow rate.

The method may be carried out in such a manner that a one (or more) of the nozzles has a first size and one or more of the nozzles has a second size, and a pressure at which the fluid is supplied to the nozzles of the first size is different than a pressure at which the fluid is supplied to the nozzles of the second size.

A tank may be provided. The tank may be configured to hold a volume of the fluid, and to capture the fluid in the tank after the fluid is sprayed. Such a tank may be well suited to facilitating a cycling of the fluid through the nozzles so that the same fluid may be sprayed many times at the AM part.

A heater may be provided, and may be arranged in the tank. The heater may be used to heat the fluid to a desired temperature. The temperature of the fluid may be increased toward the desired temperature while the AM part is sprayed.

Spraying of the fluid may occur from a first set of the nozzles that is configured to spray the fluid substantially downward toward the AM part, and also from a second set of the nozzles that is configured to spray the fluid substantially upward toward the AM part.

While spraying occurs, the nozzles may be translated. For example, one or more sets of the nozzles may be translated during spraying of the fluid.

Air may be blown into or pulled out of the chamber. This may be done during spraying and/or after spraying.

A diverter (also referred to herein as an umbrella or diverter shield) may be positioned in the chamber between the nozzles and the tank. The diverter is a spray-blocking device that shields the fluid in the tank from the pressurized spray from the nozzles above and/or blocks high-pressure spray from the upper nozzles from impacting the fluid. The diverter intercepts sprayed fluid and diverts the sprayed fluid so that the sprayed fluid does not directly impact fluid collected in the tank, thereby reducing foaming of the fluid in the tank.

BRIEF DESCRIPTION OF THE DRAWINGS

For a fuller understanding of the nature and objects of the invention, reference should be made to the accompanying drawings and the subsequent description. Briefly:

FIG. 3A is a front view of an apparatus that is in keeping with the invention;

FIG. 3B is a side view of the apparatus depicted in FIG. 3A;

FIG. 3C is a top view of the apparatus depicted in FIG. 3A;

DETAILED DESCRIPTION OF THE INVENTION

At the outset, it should be appreciated that like drawing numbers on different drawing views identify identical, or functionally similar, structural elements of the invention.

Furthermore, it is understood that this invention is not limited to the particular methodology, materials, or modifications described and, as such, the invention may vary from that which is disclosed herein. It is also understood that the terminology used herein is for the purpose of describing particular aspects, and this invention is not limited to the disclosed aspects.

Unless defined otherwise, all technical and scientific terms used herein have the same meaning as commonly understood to one of ordinary skill in the art to which this invention pertains. It should be understood that methods, devices or materials similar or equivalent to those described herein can be used in the practice or testing of the method and apparatus.

Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1:
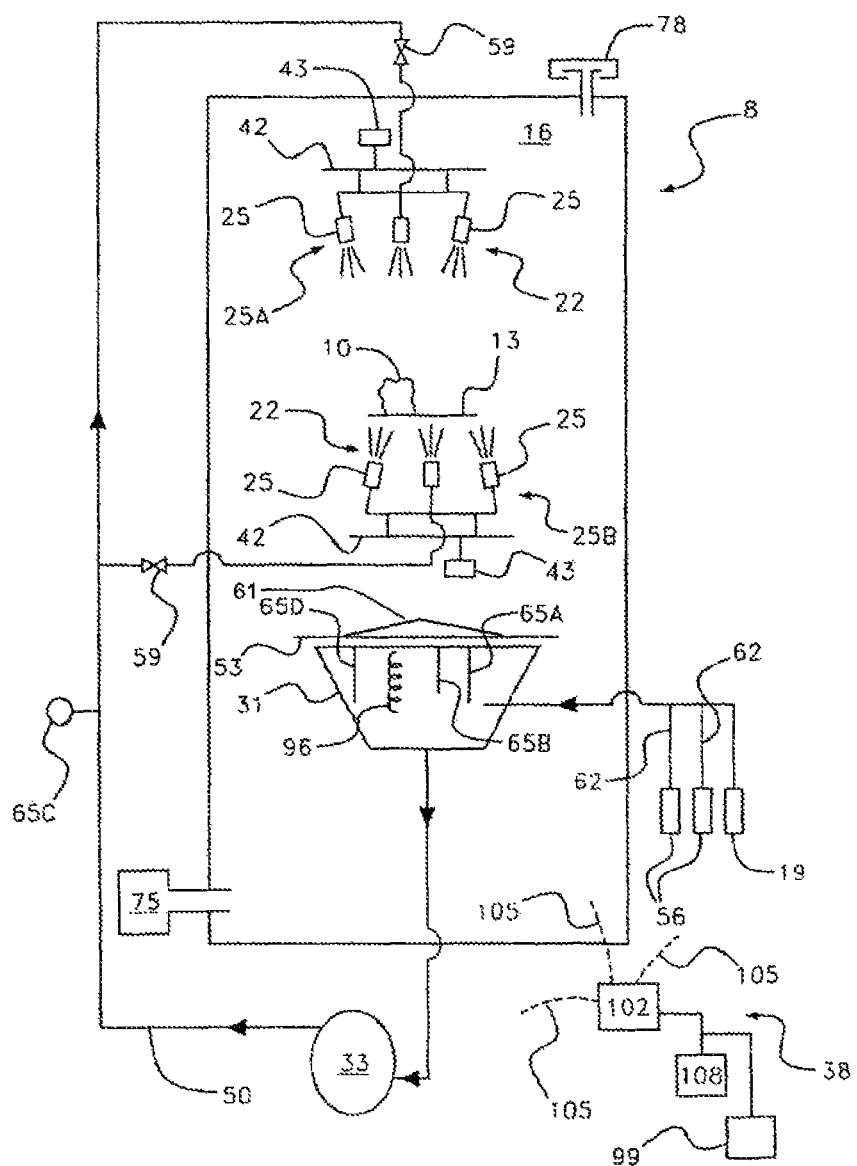
FIG. 1 is a schematic depiction of an apparatus that is in keeping with the invention.
Figure 2:
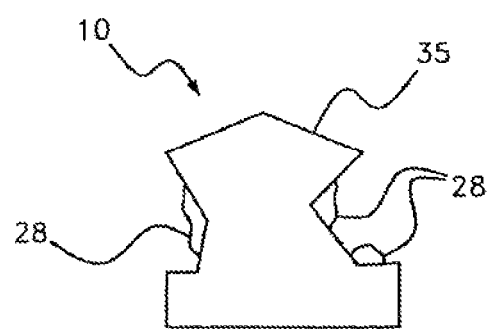
FIG. 2 is a schematic depiction of an additively manufactured part.

Adverting now to the figures, with specific reference in FIGS. 1-2, the present invention may be embodied as a method or an apparatus 8 for SF/SR. In such a method or apparatus 8, one or more additive manufactured parts 10 needing SF/SR are placed on a platform or tray 13 in a chamber 16 of an apparatus 8 for carrying out SF/SR. An SF/SR fluid 22 for dissolving and/or eroding the support material 28 may be sprayed at the part(s) 10 through nozzles 25 situated underneath the part(s) 10 or above the part(s) 10 or both. The nozzles 25 below the part(s) 10 and the nozzles 25 above the part(s) 10 may be referred herein as bottom nozzles 25B and top nozzles 25A, respectively. The fluid 22 may be supplied from a tank 31, open at its upper side. The tank 31 may be situated below the bottom nozzles 25. Located above the tank 31 below the nozzles 25 is an umbrella 61. The umbrella 61 is aligned with the spray of fluid 22 from the nozzles 25, and in particular with the spray of fluid 22 from the nozzles 25 from above the part 10. The umbrella 61 has a shallow conical shape so that fluid 22 impacting the umbrella 61 from the nozzles 25 flows toward the periphery of the umbrella 61. The periphery of the umbrella 61 has dimensions that are smaller than the open upper side of the tank 31 so that fluid 22 flowing down the umbrella 61 flows over the peripheral edge of the umbrella 61 into the tank 31. A pump 33 may be used to draw fluid 22 from the tank 31 and then force the fluid 22 through a series of pipes 50 connected to the nozzles 25, which causes the fluid 22 to spray out of the nozzles 25 at the part(s) 10. Each nozzle 25 may comprise a pipe or tube section having multiple apertures or nozzles through which the fluid 22 sprays, and these arrangements are sometimes referenced herein, as a "spray-header". The fluid 22 then collects back into the tank 31 where the fluid 22 is recycled back through the apparatus, i.e., drawn from the tank 31, forced to the nozzles 25, sprayed at the parts 10, impacted upon the umbrella 61, and collected in the tank 31. In this mode of operation the apparatus 8 may be a closed-loop system.

Additive manufactured parts 10 may be made using numerous different methods, classes of materials (e.g., plastics, metals), specific build materials (e.g., nylon within the plastics class, aluminum within the metals class) and support materials. Each method, class of material, and specific build material can have its own unique qualities and characteristics and thus may require different parameters for effective and efficient removal of support material 28. Additionally, for a given type, parts 10 made by such an additive manufacturing process and/or materials may have very different geometries, including designs having more delicate features than others, which thus may require adjustments for effective and efficient removal of support material 28. As explained in more detail herein, the amount of fluid 22 sprayed, the direction of spray (from top and/or bottom), the location of spray (e.g., left versus right side of part or top versus bottom side of part), the pressure at which fluid 22 is pumped to the nozzles 25, and the degree of atomization, as well as other parameters such as the make-up, temperature and pH of the fluid, can be adjusted to create different combinations or "recipes" of these parameters in order to efficiently and effectively remove a given type of support material 28 for a given type of build material 35 and geometric design of additive manufactured part(s) 10. In some embodiments of the present invention, an operator can set or change these parameters using a human-machine interface ("HMI") 38, such as a touch screen 108 connected to a general-purpose computer having a central processing unit ("CPU") 102. The general-purpose computer may have wired or wireless communications links 105 for sending and receiving communications signals to/from components of the apparatus 8.

The fluid 22 is capable of dissolving and/or degrading support material 28, and may be aqueous-based chemical formulations made with a single chemical or a variety of chemicals. The fluid 22 may, in some embodiments, be referred to as a detergent. Preferably, the fluid 22, either naturally or aided by the parameter settings, degrades or dissolves support material 28 and the rough surface of the part 10 without also degrading, dissolving or causing damage to the build material 35 of the part 10 that is intended to be preserved. Such fluids 22 can include but are not limited to those fluids that are optimized for SF/SR for parts 10 made by MJ, SLA and FDM, respectively. In one embodiment, the fluid 22 is a chemistry line product, such as PG2C support removal solution, available from PostProcess Technologies, Inc. Embodiments are disclosed in PCT/US2018/028685, filed Apr. 20, 2018 and PCT/US/201939398, filed Jun. 26, 2019, the entire disclosures of which are incorporated by reference herein. The fluid 22 can also include an anti-foaming agent to help minimize foaming of the fluid during the SF/SR process.

An embodiment of the present invention may be an apparatus 8 having a housing 41 comprising a first section 44, a second section 47 arranged adjacent to said first section 44, as illustrated in FIGS. 1, 3A, 3B, and 3C. The first section 44 may include a chamber 16 where the SF/SR of an additive manufactured part 10 occurs. The second section 47 may house many of the plumbing components for the apparatus 8, such as a pump 33, valves 59, and hoses 62. The second section 47 can be arranged either below or to the side of the first section 44.

The first section 44 may include a door 68 for an operator to access the chamber, and place parts 10 into and remove them from the chamber 16. The door 68 can be a counterweighted balanced door to allow for easy access. As discussed further below, the chamber 16 may heat up during the apparatus' operation. The chamber 16 can include a ventilation or exhaust system to provide a heated equalized chamber 16 to aid both in the removal of support material 28 as well as enhancing the evaporation of residual fluid 22 off of the part 10 upon completion of the SF/SR process. A ventilation system may be of any type suitable for venting heat and vapors that can build up in the chamber 16. As one example, the ventilation system may comprise one or more blowers 75 pulling air from the chamber 16, such as blowers rated, for example, at 0.5 to 1000 cubic feet per minute (CFM). In this approach the ventilation system may create a negative pressure in the chamber 16 so that when the door 68 is opened, air is pulled inward through the door 68. In another example, the ventilation system may comprise one or more fans or blowers 75 pushing air into the chamber 16, combined with a chimney or other exhaust mechanism 78 in the roof of the chamber 16. The fan or blower 75 may create a positive pressure in the chamber 16 and the chimney 78 allows excess heat and vapors to escape. Additionally, windows 81 may be placed in the sides of the chamber 16 to allow for in-process monitoring by humans and sensors of the SF/SR process.

A tray or platform 13 on which the parts 10 can be set while an SF/SR process occurs may be situated in the chamber 16. A first plurality of nozzles 25 (such as the top nozzles 25A) may be arranged in the chamber 16, allowing for fluid 22 to be sprayed downward toward the parts 10 situated on the tray 13. A second plurality of nozzles 25 (such as the bottom nozzles 25B) may be arranged in the chamber 16, directly below the tray 13, allowing for fluid 22 to be sprayed upward toward the parts 10 situated on the tray 13. The bottom nozzles 25B and top nozzles 25A are thus arranged opposite from each other, spraying in directions toward each other, with the parts 10 situated therebetween. The first section 44 also may include a tank 31 for holding the fluid 22. The tank 31 may be situated below the bottom nozzles 25B.

The tray 13 may have openings of suitable size, quantity and distribution, such as a mesh screen, so that the tray 13 can support the parts 10, yet allow fluid 22 to be sprayed at the parts 10 from the bottom nozzles 25B, allow fluid 22 sprayed from both the bottom and top nozzles 25B, 25A to flow down onto the umbrella 61 and then into the tank 31, and help to prevent support material 28 that detaches from the part 10 from falling down into the tank 31. A mesh screen 53 may be arranged beneath the umbrella 61 between the tank 31 and the bottom nozzles 25B to further prevent pieces of detached support material 28 from entering the tank 31. In this embodiment, the umbrella 61 is mounted on and attached to the mesh screen 53. The mesh screen 53 has a size that corresponds to or is larger than the upper open side of the tank 31. The size of the mesh screen 53 is greater than the periphery of the umbrella 61 so that the mesh screen 53 extends beyond the periphery of the umbrella 61. Thus, fluid flowing off the edges of the umbrella 61 flows through the mesh screen 53, but pieces of detached support material are captured on the mesh screen 53. Although the mesh screen 53 is shown extending beneath the umbrella 61, in alternative embodiments the mesh screen 53 may not extend beneath the umbrella, but may extend only beyond the peripheral edges of the umbrella 61.

In one embodiment of the invention, a first plurality of nozzles 25 comprises a single spray-header of nozzles 25, and in another embodiment of the invention the first plurality of nozzles 25 comprises more than a single spray-header of nozzles 25, such as three spray-headers of top nozzles 25A. The size of the apertures or nozzles in one spray-header of nozzles 25 can be different from the size of the apertures or nozzles in another spray-header, thereby resulting in different fluid velocities spraying from the two different sets of nozzles 25, with one velocity being higher than the other. For example, in the embodiment with three sets of top nozzle spray-headers 25A, the first and third sets can each comprise five apertures/nozzles of the same or similar size (or degree of spray angle), while the second set can comprise three apertures/nozzles of a larger size (or degree of spray angle). The top nozzles 25A can be either mounted to the housing 41 itself, or mounted on a movable track 42 connected to an actuator 43 that allows the nozzles 25 to oscillate in the horizontal direction. The second plurality of nozzles 25 can be identical to the first plurality of nozzles 25 mounted on a movable track 42 that is connected to an actuator 43, or can be stationary nozzles 25 that cannot move independently on a track. In one embodiment, the second plurality of nozzles 25 comprises a spray-header having thirteen nozzles 25 each of the same or similar size (or degree of spray angle).

In another embodiment of the invention, nozzles 25 could be arranged to surround the chamber 16 so that the nozzles 25 are on all six sides surrounding the part 10 in the chamber 16. Each nozzle 25 can be independently controlled by a separate motor or be connected as a nozzle assembly. In this embodiment there are nozzles 25 mounted both horizontally and vertically.

Figure 4:
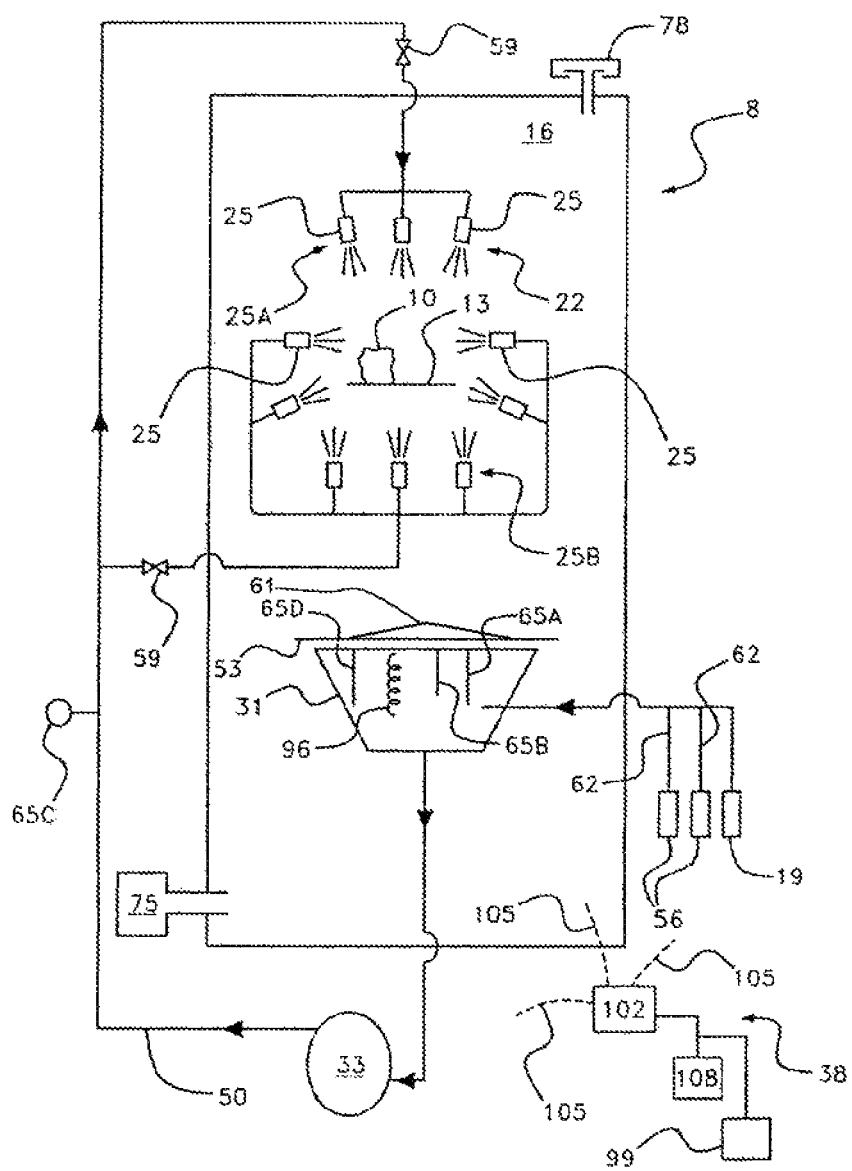
FIG. 4 is a schematic depiction of an apparatus that is in keeping with the invention.

FIG. 4 depicts a further embodiment of the invention in which the bottom nozzles 25B are arranged as a U-shaped spray-header. As with the embodiment mentioned directly above, the nozzles 25 may spray the AM part 10 from different directions and thereby spray additional sides of the AM part 10 more directly. In a similar manner, the top spray-header of nozzles 25A may be U-shaped. Or, both the top spray-header of nozzles 25A and the bottom spray-header of nozzles 25B may be U-shaped.

Servomotors or other actuators may be used to oscillate a spray-header of nozzles 25 through a range of distance about a center point. Interface and control buttons may enable an operator to adjust the location of the center point (by causing the spray-header of nozzles 25 to move forward or backward) and/or the speed at which the nozzles 25 oscillate. For example, the center point could be set anywhere between a range of 0-275 millimeters and the speed could be set anywhere between a range of 0-50 mm/sec. Or, these parameters may be pre-stored in connection with an operating recipe that the operator has the option to select. In one embodiment of the invention the operator can also adjust the distance that the nozzles 25 oscillate. The movement of each nozzle 25 may be tracked by a position sensor. The first plurality of nozzles 25 could be made to oscillate only if at least one of the valves 59 to a nozzle contained in the first plurality of nozzle 25 is open. In such an embodiment, if only the second plurality of nozzles 25 is activated, then the first plurality of nozzles 25 does not oscillate.

The nozzles 25 can be individual nozzles 25, or can be tubes/piping having a plurality of apertures therein, e.g. a manifold (each such aperture is also referred to as a "nozzle"), or could include nozzles 25 secured to the tubes/piping. Additionally, the individual nozzles 25, including individual nozzles secured to the tubes/piping, may be constructed to rotate independently, using motors, in order to spray parts 10 within the chamber 16 at a variety of angles. Each nozzle 25 may be independently controlled by a separate motor or be connected to each other so as to form a nozzle assembly. Additionally, each nozzle 25 could be controlled by a multi-axis robot. The nozzles 25 may be made to move in horizontal and/or vertical directions. It should be appreciated that each nozzle 25 may be connected to its own pump and plumbing system.

Both the first and second plurality of nozzles 25 (e.g., top and bottom nozzles 25A, 25B) may be connected to a pump 33, which may be located within the second section 47 of the housing 41. After drawing fluid 22 from the tank 31, the pump 33 can force the fluid 22 through pipes 50 (which may be a flexible hose) to the nozzles 25. A manifold may be used to separate the fluid 22 output from the pump 33 into separate supplies for each spray-header of nozzles 25. The individual pipe 50 to each spray-header of nozzles 25 may include a valve 59 to control the flow of fluid 22 to the nozzles 25. This arrangement allows nozzles 25 to be used selectively (on/off), thereby increasing efficiency where all of the nozzles 25 are not required for SF/SR and/or where it is preferred to have some nozzles 25 at higher or lower pressures than others.

For example, an embodiment of the invention may have one bottom spray-header of nozzles 25 and three top spray-headers of nozzles 25, where at least one of the top spray-headers has narrow-angle nozzles 25 (producing comparatively higher velocity spray) and at least one of the other top spray-headers has wide-angle nozzles 25 (producing comparatively lower velocity spray). In each of the following examples, the valve 59 controlling flow to the bottom spray-header of nozzles 25 may always be open. In one mode of operation, all of the valves 59 controlling flow to the top nozzles 25 can be closed so that fluid 22 sprays only from the bottom spray-header 25B. This mode can produce the lowest degree of agitation of the additively manufactured parts 10 being SF/SR processed in the chamber 16, and may be referred to as "ultra-low agitation." In another mode of operation the valve(s) 59 controlling flow to the top spray-header(s) 25A having wide-angle nozzles 25 may be open, but the valve(s) 59 controlling flow to the top spray-header(s) 25A having narrow-angle nozzles 25 may be closed. This mode can produce a higher degree of agitation than where only the bottom nozzles 25B are used, and may be referred to as "low agitation." In yet another mode of operation, the valve(s) 59 controlling flow to the top spray-header(s) 25A having wide-angle nozzles 25 may be open and the valve 59 controlling flow to one (but not more than one) top spray-header having narrow-angle nozzles 25 may be open. This mode can produce a higher degree of agitation than the prior example, and may be referred to as "medium agitation." In yet a further mode of operation, the valve(s) 59 controlling flow to the top spray-header(s) 25A having narrow-angle nozzles 25 may be open but the valve(s) 59 controlling flow to the top spray-header(s) 25 have wide-angle nozzles 25 may be closed. This mode can produce the highest level of agitation, and may be referred to as "high agitation." Other arrangements of spray-headers, varying sizes of nozzles 25, and open versus closed valves 59 may be used to create additional variations in the levels of agitation. Thus, the use of terms such as "low," "medium" and "high" are not meant to be limited to the precise arrangements described in the foregoing examples, but rather to exemplify that various, relative degrees of agitation can be accomplished as desired to meet specific needs.

An operator can use the HMI 38 to select a desired level of agitation, or the agitation level may be pre-stored in connection with a given operating recipe that the operator has the option to select. By setting the agitation level, the apparatus 8 automatically opens and closes the valves 59 to the nozzles 25 as appropriate to achieve that selected level of agitation. These parameters can be set individually or by selecting a pre-stored recipe.

The pressure of the fluid 22 pumped through the system may be a function of a variety of factors including the action of the pump 33, the length, sizing and configuration of the plumbing between the pump 33 and the nozzles 25, and the sizes and quantity of nozzles 25. The apparatus 8 may have one or more sensors 65C located at or near the inlet to each valve 59 leading to each spray-header of nozzles 25, or at another suitable location, for measuring and monitoring the pressure of the fluid 22 being forced to the nozzles 25. This pressure can be, for example, from 0.01 psi to 100 psi. During operation, the pressure can change for a variety of reasons, and the apparatus 8 may include sensors 65C for measuring the pressure. The apparatus may alert the operator if the pressure begins to decrease or increase from the level expected, or initially achieved, for a given set of SF/SR processing parameters, and also may alert the operator if the pressure drops below or exceeds minimum and maximum levels, respectively. These minimum and maximum levels can be pre-programmed into the apparatus 8. Additionally, if these minimum or maximum pressure levels are exceeded, the apparatus 8 can to automatically shut down.

An embodiment of the invention may simultaneously achieve a high rate of fluid flow through the nozzles 25, such as 5 to 150 gallons per minute, and a low pressure at which the fluid 22 is provided to the nozzles 25, such as 15-30 psi. The speed at which support material is removed may be aided by having as much flow of fluid 22 on the part 10 as possible, while protecting the build material 35 of the part 10 from erosion by maintaining the fluid velocity below a desired level. The nozzle aperture sizes (and/or spray angles), quantities of nozzles 25 and specifications for the pump 33 and plumbing may be selected to achieve these multiple goals. Additionally, oscillating the nozzles 25 changes the direction and speed of the spray exiting the nozzles 25, which provides an additional opportunity for modulating both the force of the fluid 22 impacting the parts 10 as well as the area covered by that fluid 22. For example, oscillating the nozzles 25 at a higher speed may result in a lower average force at which the fluid 22 impacts the additive manufactured parts 10 and a wider coverage area within the chamber 16.

Figure 5:
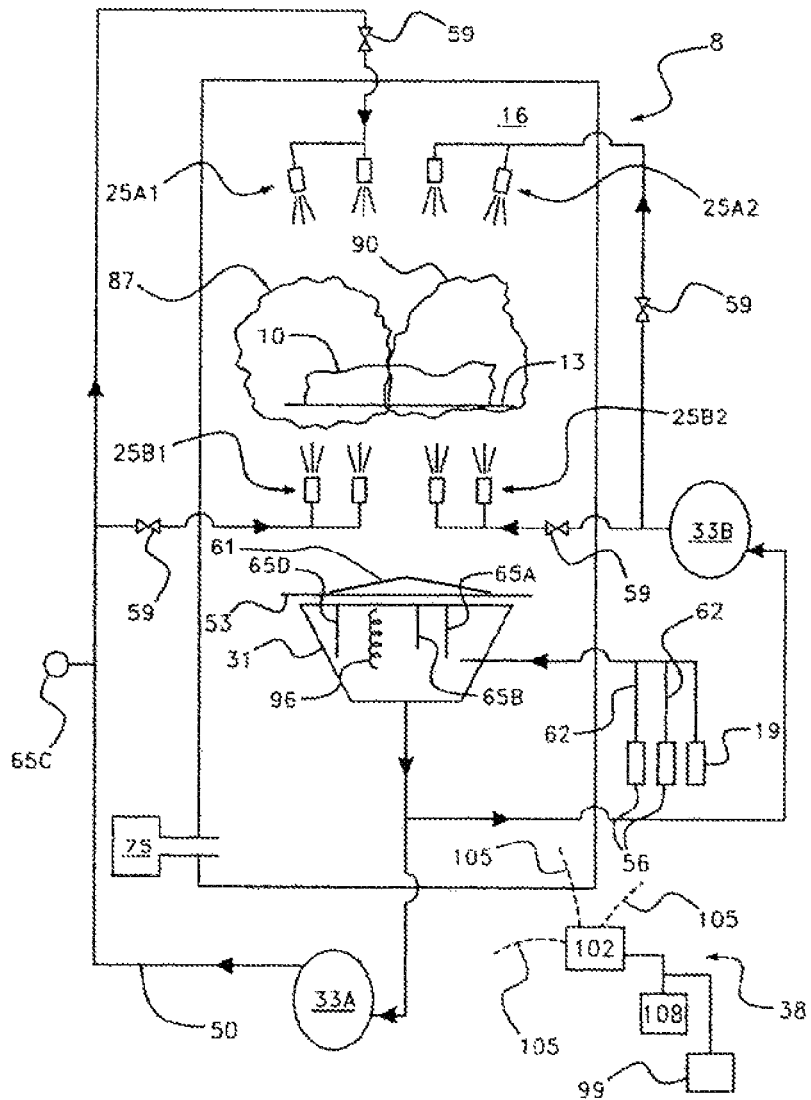
FIG. 5 is a schematic depiction of an apparatus that is in keeping with the invention.

In another embodiment of the invention as illustrated in FIG. 5, a wider chamber 16 is used and there are two systems of top and bottom nozzles 25, arranged adjacent to each other, effectively defining first processing region 87 and second processing region 90 within the chamber 16. In this embodiment, fluid 22 is delivered to the first processing region 87 by the first top nozzles 25A1 and first bottom nozzles 25B1, and fluid 22 is delivered to the second processing region 90 by the second top nozzles 25A2 and second bottom nozzles 25B2. In this embodiment, the tank 31 situated below the bottom nozzles 25B can be a single tank 31 spanning the two regions 87, 90. A first pump 33A can be connected to the first top and first bottom nozzles 25A1, 25B1, and a second pump 33B can be connected to the second top and second bottom nozzles 25A2, 25B2. In this embodiment, the pumps 33, valves 59, spray-headers of nozzles 25, and all of the various settings relating thereto can be set and operated in the two regions 87, 90 independently.

This embodiment enables the apparatus 8 to have different flow rates, pressures and spray velocities (i.e., agitation levels) as between the two regions 87, 90. This can be useful in several ways. For example, some additive manufactured parts 10 are long and have more support material 28 and/or surface areas of build material 35 toward one end of the part 10 ("heavy end") versus the opposite end ("light end"). If the same flow, pressure levels and spray velocities were applied across the entire part 10, then either the light end would be at risk for over-processing (which might include degradation or warping of the part 10) or the heavy end of the part 10 would be at risk for under-processing (leaving too much support material 28 or un-smoothed surfaces of build material 35 remaining on the part 10). By having two independent SF/SR processing regions 87, 90, the part 10 can be situated in the chamber 16 so that the end with more support material 28 and/or surface areas of build material 35 lies in the region that has higher flow, pressure and spray velocity, while the other end of the part 10 with less support material 28 and/or surfaces areas of build material 35 lies in the region that has lower flow, pressure and spray velocity. This protects the second end of the part 10 from over-processing and the first end of the part 10 from under-processing. Another advantage of having two regions is that a given part 10 may have more support material near its bottom area than near its top area. A quantity of these parts 10 could be simultaneously SF/SR processed with a portion of the quantity oriented upright in one region and the other portion oriented upside down in the other region, with each region having flow of fluid 22 and pressure appropriate for those orientations of the parts.

In an embodiment where nozzles are configured to oscillate during a SF/SR process, a motion-monitoring sensor can be used to detect which of the nozzles 25 are moving during the SF/SR process. The apparatus 8 may frequently monitor the position of the nozzles 25 and if no motion is detected, the apparatus 8 may attempt to reset the motor controlling movement of the nozzles 25. If a reset of the motor is unsuccessful, then the HMI 38 may alert a user and pause the SF/SR process since the apparatus 8 may not be operating properly. The detection of nozzle movement may be done via an encoder arranged on each motor or by other suitable means.

The tank 31 may be filled automatically with fluid 22 based on parameters set by the operator or as may be pre-stored in connection with a given operating recipe that the operator has the option to select. To this end, the apparatus 8 may include devices for supplying each of water, support material solvent (also referred to as detergent), and anti-foaming agent supplies. Water may be supplied from a facility's water supply 19 or from a reservoir or other storage tank. Solvent and anti-foaming agent may be supplied each from their own reservoir or storage tank, such as a 5-gallon bucket 56 connected to the apparatus by a hose 62 or other conduit. The hose 62 for each of the solvent and anti-foaming agent may be connected to a mechanism, such as a water-powered pump, for automatically dispensing such fluids into the tank.

A liquid level sensor 65D may be situated in the tank 31 to detect the level of the fluid 22 in the tank 31, thereby enabling a determination of when the fluid 22 filling the tank 31 reaches the maximum level, at which point the sensor 65D sends a signal that is interpreted and results in the filling to automatically stop. The sensor 65D also may be employed to enable detection of when the fluid 22 drops below a desired level during operation, which can happen for example as fluids evaporate, and may send a signal that is interpreted and may result in alerting the operator to use the interface to cause more fluids to be dosed into the tank (which dosing again stops automatically if the maximum fill level is reached). Alternatively, programming could be provided to cause this dosing to occur automatically.

Use of this auto-dose feature ensures that enough fluid 22 is arranged in the apparatus 8 for the SF/SR process to run properly. When an apparatus 8 runs for an extended period of time at high temperatures, the fluid 22 used in the SF/SR process evaporates. Also, amounts of fluid 22 may adhere to interior surfaces of chamber 16 and to surfaces of components within chamber 16. In order to ensure that enough fluid 22 remains in the system, a configurable desired fluid level may be set in the software of the apparatus 8, and the fluid level in the tank 31 may be detected using a liquid level sensor 65D such as a floating sensor to detect the liquid level. If the liquid level falls below the desired level, the apparatus 8 could react by supplying additional amounts of one or more components of the fluid 22 (e.g., water, solvent, anti-foaming agent) into the tank 31. Additionally, a configurable time interval could be set by a user for checking the liquid level during the SF/SR process. At the end of a configurable time interval, the SF/SR process may pause for an amount of time (for example, 30 seconds) in order to let foam that may have formed in the tank 31 to settle. Once the settling time has elapsed, a liquid level measurement may be taken. If the liquid level has not attained the desired level, the apparatus 8 may automatically add fluid to the tank 31 and in order to fill the tank 31 up to the desired liquid level.

A heater 96, such as an immersion heater, and a sensor 65B for measuring temperature, may be situated in or in connection with the tank 31. Additionally, a pH sensor 65A may be situated in or in connection with the tank 31. The heater 96 may be used to heat the fluid 22 to a desired temperature and, based on feedback from the temperature sensor 65B, to maintain the fluid 22 at that temperature. The heater 96 may be used to heat the fluid 22 to a desired temperature within an allowable range, such as for example, 85.degree. F. to 160.degree. F., or another process-suitable range. The fluid 22 in the tank 31 may be heated to the desired temperature prior to starting the SF/SR process to spray the parts 10, or the fluid 22 can be used before it is heated at all or when it is only partially heated to the desired temperature. In this latter approach, the SF/SR process begins with the fluid 22 at a low temperature and, as time elapses during the SF/SR process, the heater 96 operates to increase the temperature of the fluid 22 to the desired level. The approach of gradually increasing the temperature of the fluid 22 can aid in the removal of support material 28. This is because the fluid 22 can usually remove support material 28 over a range of temperatures. Thus, by engaging in SF/SR as the fluid temperature rises, the fluid 22 can begin to remove support material 28 as the fluid 22 reaches the lowest temperature suitable for removing support material 28 and then remove the support material 28 more rapidly as the fluid approaches the final desired temperature. In this manner, the build material 35 of the part 10 will not heat up as much as compared to the case where the fluid 22 is at the highest temperature from the start of the SF/SR process. This helps to protect the build material 35 of the part 10 from degradation, such as warping.

The pH sensor 65A can detect the pH of the fluid 22, which at the outset can be a reflection of the combination of liquids forming the fluid 22 (e.g., solvent, water and, if used, anti-foaming agent) and may be used while filling the tank 31 to achieve the desired pH. The pH can change during the apparatus' 8 operation, for example due to dissolved support material 28 contaminating the fluid 22 or due to evaporation of portions of the fluid 22. The pH sensor 65A may be used to detect such changes and to alert the operator when the pH drops below or exceeds a desired level, whereupon the operator may use the HMI 38 to cause dosing of fluids as needed to adjust the pH to the desired level. For example, if the pH is too high (i.e., too basic), then more solvent can be added. But if the pH is too low (i.e., too acidic), then more water can be added. Alternatively, the apparatus 8 may be configured to automatically dose fluids as needed to adjust the pH. The desired temperature and pH may be set by the operator using the HMI 38, or may be pre-stored in connection with a given operating recipe that the operator has the option to select.

As the fluid 22 flows through the apparatus 8, its temperature can change, which may be undesirable. In particular, it is important to maintain the fluid 22 at the desired temperature as it travels from the tank 31 to the nozzles 25. Yet, many pumps 33 heat up while they are operating and transfer that heat to the fluid 22 as it moves through the pump 33. In embodiments of the present invention, it is preferable to use a pump 33 that adds minimal heat to the fluid 22, such as a magnetically coupled pump 33.

Atomization of the fluid 22 by spraying it through appropriately sized nozzles 25, where the fluid 22 separates into small droplets while also spreading out in a flat fan, hollow cone, or full cone spray pattern helps to control the force at which fluid 22 impacts the part 10 while maximizing flow of the fluid 22. The top nozzles 25A may be further away from the parts 10 being SF/SR processed than the bottom nozzles 25B, and in such a configuration, the force of the spray from the top nozzles 25A as it impacts the parts 10 can sometimes fall below a desired amount. The design of the bottom nozzles 25B can help with this. The spray from the bottom nozzles 25B may have enough force to hit the bottom of the parts 10 and then continue to travel upwards to heights above the parts 10. There, the droplets combine with each other and/or droplets from the top nozzles 25A into larger droplets, whereupon these larger droplets fall down onto the parts 10. Aided by both gravity and the force of the drops from the top spray nozzles 25A, these larger particles may hit the parts 10 with more flow and kinetic energy than drops coming from the top nozzles 25A alone or the bottom nozzles 25B alone. Nonetheless, the top nozzles 25A may be mounted in a way so as to be adjustable closer to or further away from the parts 10. Likewise, the location of the parts 10 may be adjustable such that parts 10 are set further away from the bottom nozzles 25B and thus closer to the top nozzles 25A, or vice-versa.

The fluid 22 in the tank 31 may be drained automatically. At the end of each SF/SR process, there may be the option to drain all the fluid 22 from the tank 31 and replace it with new fluid 22. This option may be pre-set by the operator or selected by the operator upon the completion of an SF/SR process. An auto-drain feature may also be used to drain the tank 31 after a prescribed number of SF/SR processes, which may be set by the operator.

After the tank 31 is drained, the tank 31 may be automatically filled with clean water, and used for rinsing the part 10 in order to remove fluid 22 remaining on the part 10. The water may be heated in the same manner as the fluid 22. When selecting the parameters for the SF/SR process, the operator may set the temperature for the rinsing water or select the temperature from a pre-stored recipe. In one embodiment, the fluid 22 for removing support material 28 may be automatically drained from the tank 31 after the designated run time and replaced with clean water (using the same auto-fill mechanisms described above), which is then cycled through the apparatus 8 to rinse the parts 10, at the same agitation level setting as used during the support removal portion of the SF/SR process. During this rinsing process, the water may be pre-heated to the desired temperature or the temperature may be gradually raised while the apparatus is running.

During the SF/SR process, heat from the fluid 22 in the tank 31 can heat up air in the chamber 16. This heated air in the chamber helps, in turn, to maintain the fluid 22 at the desired temperature while fluid 22 is sprayed from the nozzles 25 and collects back into the tank 31. At the end of a SF/SR and/or rinse cycle, the heater 96 in the tank 31 may be kept operating to maintain the heat in the chamber 16, which, in turn, may be useful for drying the parts 10 prior to removing them from the chamber 16. When carried out in this manner, an SF/SR process may be said to be a "dry-to-dry" process: that is the parts 10 placed in the chamber 16 are dry and do not require preparation work to be done on them prior to the SF/SR process, and the parts 10 come out of the chamber 16 dry after the SF/SR process is complete.

Figure 6:
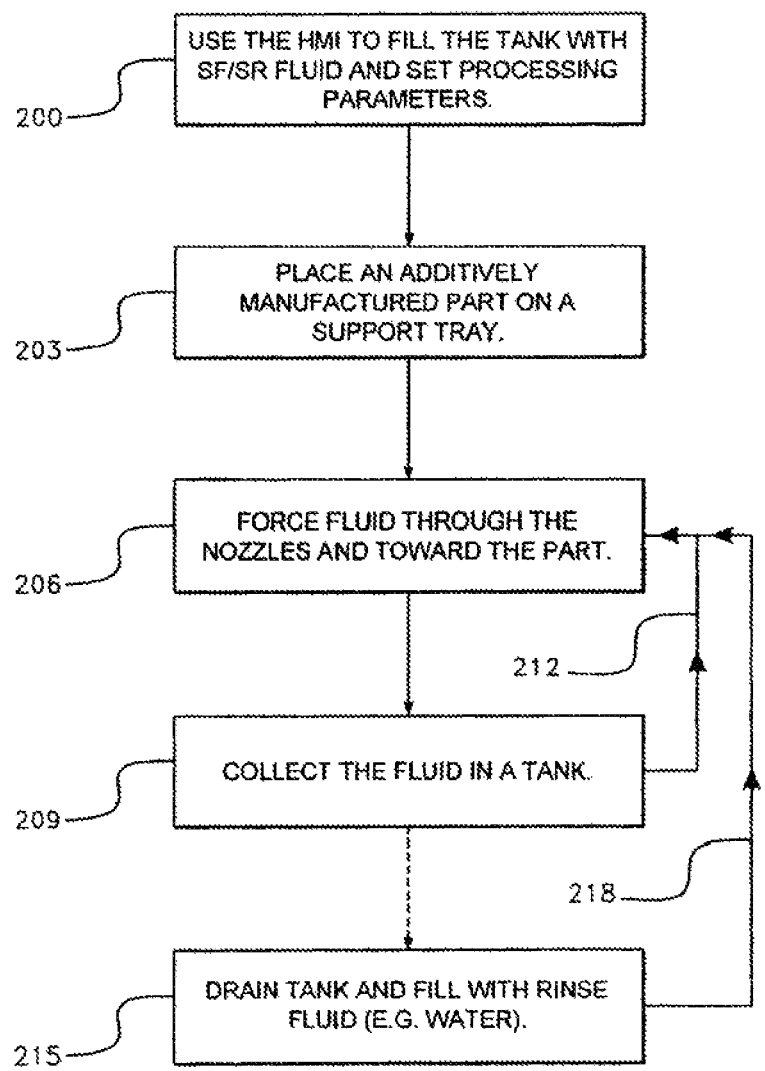
FIG. 6 is a flow diagram depicting a method that is in keeping with the invention.

Operation. A method according to the present invention, illustrated in FIG. 6, may comprise the following of steps to remove support material 28 and/or finish a surface of build material 35 of a part 10 and rinse residual material from a part 10 made using additive manufacturing. The operator may use 200 the HMI 38 to cause the tank 31 to fill with fluid 22. The operator also may use the HMI 38 to set other SF/SR processing parameters for the additive manufactured parts 10 to be SF/SR processed, including temperature (of both the support removal and rinsing fluids), pH of the fluid 22, the length of run time (in hours and minutes), agitation level (e.g., ultra-low, low, medium or high agitation), center-point position of the top spray-header(s) of nozzles 25, the range of distance through which the top nozzles 25A oscillate, and the speed of oscillation of the top nozzles 25A. Additionally, the operator may place 203 one or more additive manufactured parts 10 on the tray 13 within the chamber 16. The heater 96 in the tank 31 may operate to heat the fluid 22, which in turn helps to heat the air in the chamber 16. The fluid 22 can be brought to full temperature prior to starting the SF/SR process, or gradually after the SF/SR process begins.

Next, the pump(s) 33 may activate, drawing fluid 22 from the tank 31, through the pump(s) 33, and then forcing 206 the fluid 22 through the manifold (if used) and those of the open valves 59 toward and through the nozzles 25 associated with the open valves 59 in order to spray the fluid 22. The upper nozzles 25A may oscillate when the associated valves 59 are open and allow fluid 22 to flow to the nozzles 25A, and those nozzles 25A may rotate or otherwise move in accordance with the selected settings. The fluid 22 then exits the nozzles 25 as atomized and/or semi-atomized fluid 22 and collides with the part 10, including the support material 28, whereupon the support material 28 begins to dissolve or otherwise separate from the part 10 and/or rough surfaces of build material 35 of the part begin to smooth. The fluid 22 then passes through the openings in the tray 13, impacts on the umbrella 61, flows off the umbrella 61, and collects 209 in the tank 31 located under the bottom nozzles 25B, whereupon the fluid 22 cycles 206 through the nozzles 25 again as the pump 33 continues to draw fluid 22 from tank 31. This cycling 212 of the fluid 22 continues for the duration of the run time set by the operator or until the operator manually stops the SF/SR process.

During the SF/SR process, the apparatus 8 may measure the fluid level in the tank 31 to ensure enough fluid 22 is contained in the tank 31. If there is not enough fluid 22 in the tank 31 (e.g., due to evaporation) the apparatus 8 may add fluid 22 components, such as the water, solvent and/or anti-foaming agent as appropriate. The apparatus 8 also may measure the pH of the fluid 22 and dose the tank 31 with water and/or solvent as needed to maintain the desired pH level.

After the prescribed amount of time, the spraying stops, the fluid 22 may automatically drain 215 from the tank 31, the tank 31 may automatically fill 215 with clean water, and then the spraying may re-start to rinse the parts 10. The water may be cycled 218 through the system until a prescribed amount of time has elapsed, the rinsing process stops, and the parts 10 may remain in the chamber 16 for drying by the heated air in the chamber 16.

The ventilation system may operate during the SF/SR process to safely exhaust excess vapors and thus prevent them from escaping out of the chamber 16 to areas that could pose a threat to users standing around the apparatus 8 while the SF/SR process is occurring. The ventilation system may be kept running for a time interval (for example, 5 minutes) after an SF/SR process is completed.

The method may be carried out so as to determine the agitation level in concert with optimal temperature in order to maximize the speed and efficiency of SF/SR processing. When the fluid 22 is too cool, the support material 28 may not be removed as efficiently, but when the fluid is too hot, the part can experience damage such as shape degradation, including warpage. Additionally, as will be appreciated by the disclosure herein, the hardware, electronics, software and fluid 22 may work together to provide desired levels of efficacy and efficiency, from delicate support removal to more robust removal with higher throughput.

Settable parameters can be different and/or customized for particular build and support materials 35, 28 out of which the additive manufactured parts 10 are made, the part geometries including the geometries of support structures, and the degree and speed of support material removal desired. Balancing and varying these parameters increases the efficacy and efficiency at which support material 28 can be removed. The apparatus 8 can be pre-programmed at a factory with "recipes" of the parameter settings known to be suitable for various support and build materials 28, 35, part geometries, etc. Thus, by a single activation operation, e.g. pressing one button or a short sequence of buttons, the operator may be able to set all of the parameters for a given SF/SR process. Additionally, the operator can set parameters and save them as a recipe, which the operator can then select in the future rather than re-inputting each of the settings.

The present invention may further include a logic controller 99 to monitor communication between a central processing unit ("CPU") 102 and the HMI 38. In such an embodiment of the invention, a signal may be sent from the HMI 38 to the CPU 102, and vice-versa. The logic controller 99 may monitor this signal to make sure the signal changes during the SF/SR process. If the signal stops, the logic controller 99 may react by either shutting down the apparatus 8, or the HMI 38 will inform the operator to restart the apparatus 8. The HMI 38 and CPU 102 may be connected to the Internet in order to be operated and evaluated remotely. Additionally, this Internet connection could enable the use of a database that contains a plurality of test parameters and additional recipes that may be used to optimize the SF/SR and rinse processes. The database may alternatively be contained on a hard drive that may be associated with the apparatus 8 itself and be uploaded periodically to a remotely located storage device.

The apparatus 8 may collect and store data about settings and about how the apparatus 8 should or does operate, which can be used to service the apparatus 8 and as feedback for improving SF/SR settings for various types of support and build materials 28, 35 and part geometries.

In the embodiments shown in FIGS. 1, 4, and 5, the umbrella 61 serves to prevent the fluid 22 being sprayed at the part 10 from forcefully impacting the fluid collecting the tank 31, thereby shielding the fluid 22 in the tank 31. As described above, the fluid 22 can be sprayed at the part 10 from the nozzles 25 at pressure. Some of the spray flows past the part 10 and through the platform 13. In the absence of the umbrella 61, the spray could forcefully impact the fluid collecting in the tank 31, possibly leading to undesirable foaming of the fluid collecting in the tank 31. The umbrella 61 is aligned to intercept the spray of fluid 22 so as to prevent it from forcefully impacting the fluid collecting in the tank 31. The umbrella 61 diverts the fluid 22 toward the periphery of the umbrella 61 so that the fluid 22 gently flows into the tank 31. By reducing some or all the spray that forcefully impacts the fluid collecting in the tank 31, foaming can be reduced.

The umbrella 61 can be made of any suitable material, such as stainless steel or a non-reactive plastic. The umbrella may have a shape other than a shallow cone. For example, the umbrella may have an inverted conical shape (with a drain in the middle), a flat planar shape, or a flat slanted planar shape. The umbrella may be formed of a single piece of material or multiple pieces, e.g., a multiple piece baffle. A property of these different umbrella shapes is that they intercept the flow of spray to reduce its force before allowing the fluid to collect in the tank for reuse.

Figure 7:
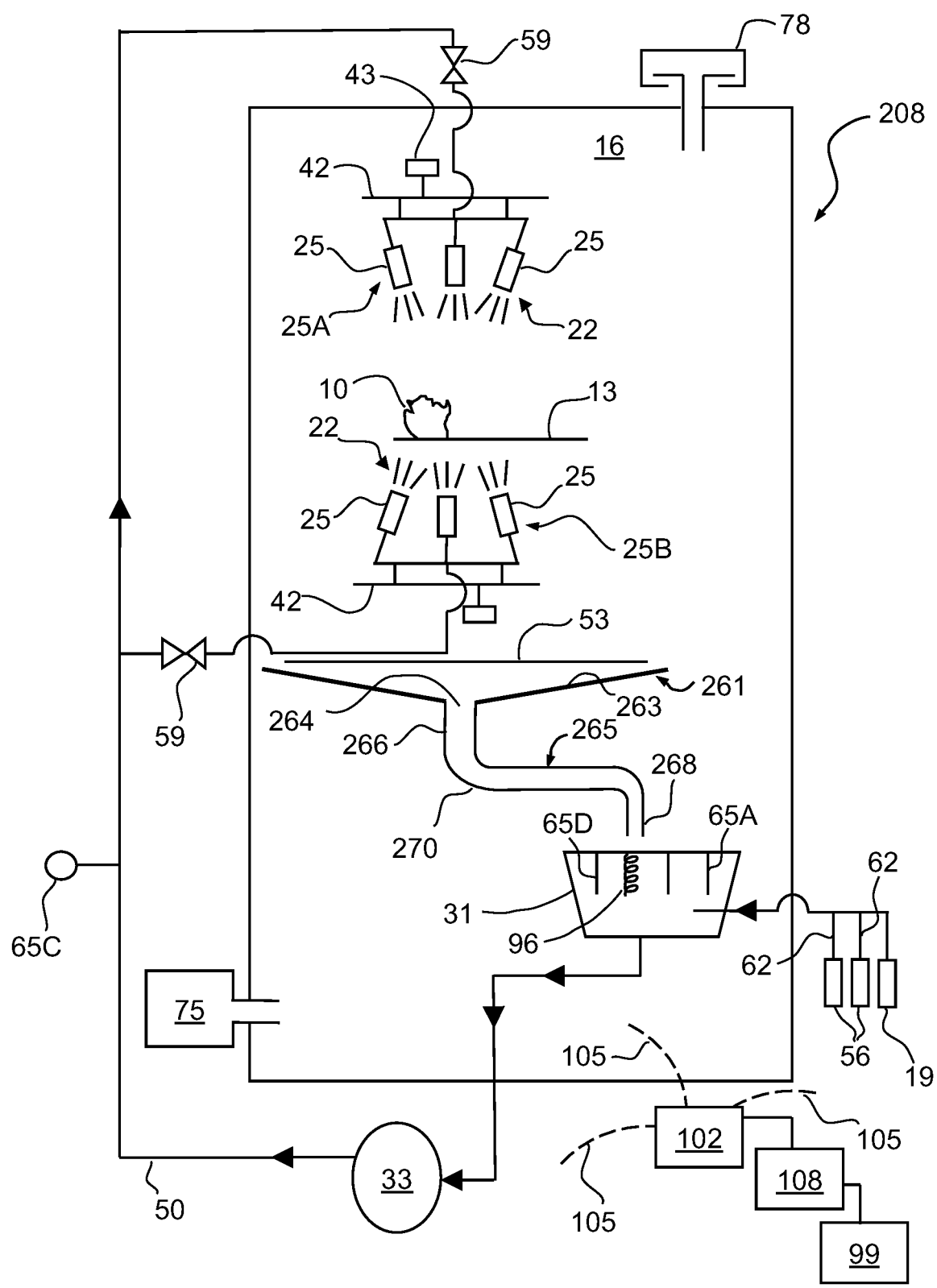
FIG. 7 is a schematic depiction of an alternative embodiment of an apparatus that is in keeping with the invention.

FIG. 7 shows an alternative embodiment of an apparatus 208 for surface finishing or support removal of parts made by an additive manufacturing process. The apparatus 208 in FIG. 7 has components that are similar to those in the apparatus 8 shown in FIG. 1, and like components in FIG. 7 are indicated by the same numerals as in FIG. 1.

Figure 8:
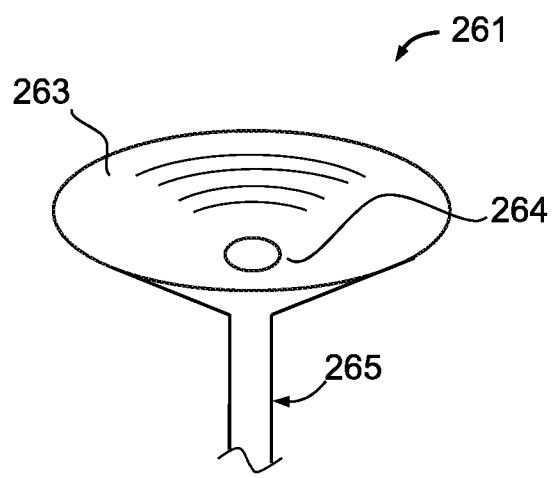
FIG. 8 is a perspective view of the diverter shown in FIG. 7.

The apparatus in FIG. 7 includes a diverter shield 261. The diverter shield 261 serves a function similar to the umbrella 61 shown in FIGS. 1, 4, and 5. The diverter shield 261 is located below the bottom nozzles 25B and is aligned with the direction of the spray of fluid 22 from the upper nozzles 25A located above the platform 13. As shown in FIGS. 7 and 8, the diverter shield 262 has a shield main body portion 263 that has a shallow profile that tapers toward an opening 264 at a center of the main body portion 263. The diverter shield 261 can be made of any suitable material, such as stainless steel or a non-reactive plastic. Connected to the diverter shield 261 at the opening 264 is a drain member 265. The drain member 265 has an upper portion 266, a lower portion 268 and a middle portion 270. The upper portion 266 of the drain member 265 connects to the opening 264 of the diverter shield 261. The lower portion 268 of the drain member 265 opens to the tank 31. The middle portion 270 connects the upper portion 266 to the lower portion 268 and provides for a flow path between the bottom of the diverter shield 261 to the tank 31. In this embodiment, the tank 31 is located spaced away from the spraying fluid 22 to reduce or eliminate foaming caused by impact of the fluid spray on the fluid contained in the tank 31. In one embodiment, the tank 31 may be located outside the chamber 16.

The apparatus 208 in FIG. 7 operates similarly to the apparatus 8 shown in FIG. 1, 4, or 5. Spray 22 from the nozzles 25 impacts or falls on the main body portion 263 of the diverter shield 261. Because the main body portion 263 is slanted toward the opening 264, fluid 22 does not accumulate on the main body portion 263 of the diverter shield 261. Instead, fluid 22 impacting or falling on the main body portion 263 of the diverter shield 261 flows toward the opening 264 and drains through the opening 264 into the drain member 265. Fluid 22 flows through the drain member 265 into the tank 31 from which it is then pumped back to the nozzles 22 as described in connection with the other embodiments. Because fluid does not accumulate on the main body portion 263 of the diverter shield 261, foaming is reduced or eliminated.

Figure 9:
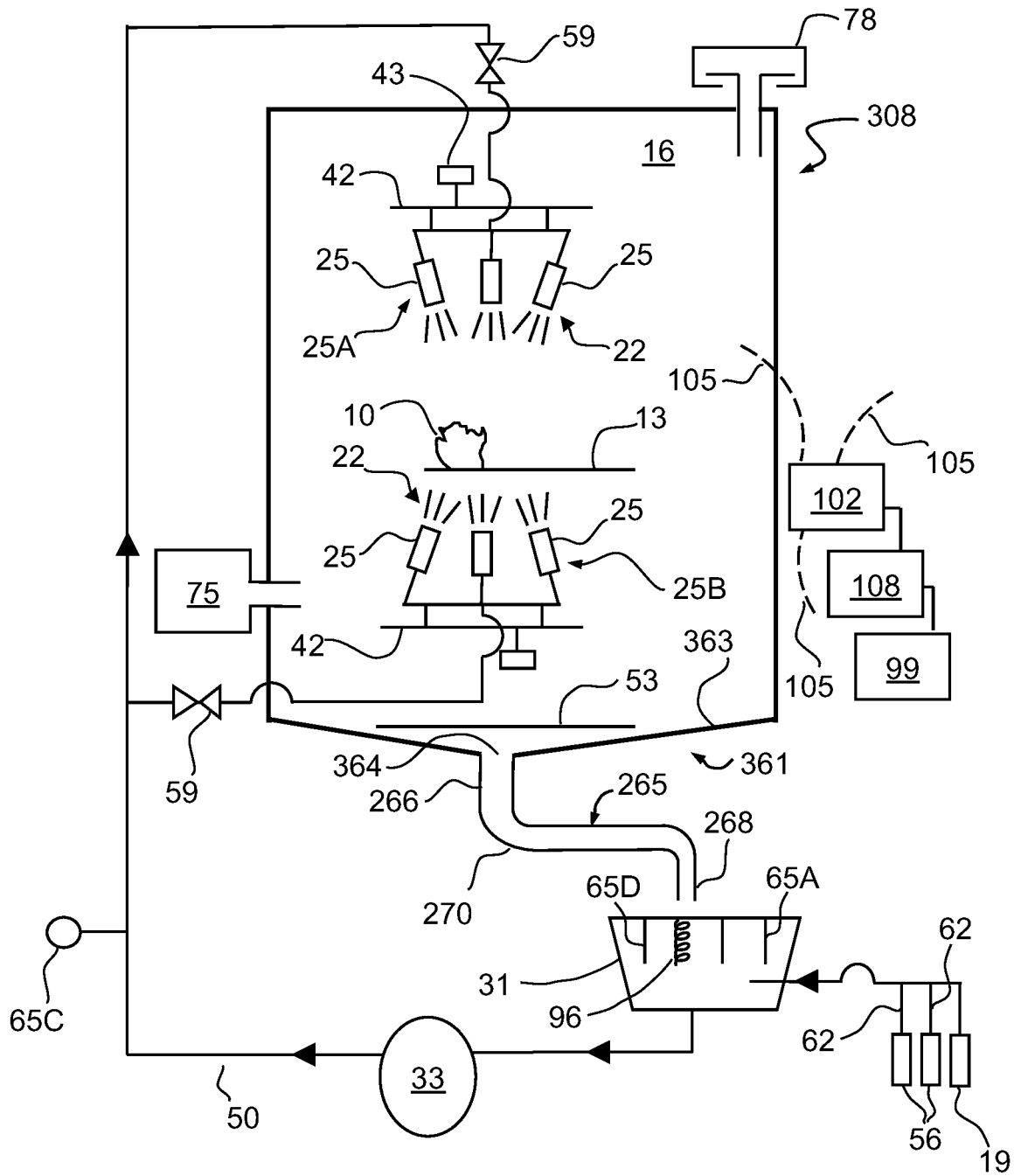
FIG. 9 is a schematic depiction of another alternative embodiment of an apparatus that is in keeping with the invention.

FIG. 9 shows another alternative embodiment of an apparatus 308 for surface finishing or support removal of parts made by an additive manufacturing process. The apparatus 308 in FIG. 9 has components that are similar to those in the apparatus 8 shown in FIG. 1 and the apparatus 208 shown in FIG. 7, and like components in FIG. 9 are indicated by the same numerals as in FIGS. 1 and 7. In the embodiment of FIG. 9, a floor 361 of the chamber 16 tapers toward a drainage opening 364 located in the center of the floor 361. Like the embodiment in FIG. 7, a drain member 265 connects to the drainage opening 364 to allow fluid to drain to the tank 31. In the apparatus 308 in FIG. 9, the tank 31 is located outside the chamber 16. In the apparatus 308 in FIG. 9, in addition to the mesh 53 located in the chamber 16 below the nozzles 25, there may be an additional mesh screen located between the lower portion 268 of the drain member 265 and the tank 31. Like the embodiment of FIG. 7, the embodiment of FIG. 9 prevents or reduces foaming by locating the tank 31 away from the spray from the nozzles 25. Also like the embodiment of the apparatus in FIG. 7, the embodiment 308 in FIG. 9 does not allow fluid to accumulate where spray from the nozzles 25 can cause foaming.

A diverter comprised of an umbrella or a diverter shield aligned to intercept a spray used for post-processing of parts made by additive manufacturing techniques can be used in other post processing systems. An embodiment of such a system is disclosed in U.S. patent application Ser. No. 16/209,778, filed Dec. 4, 2018, the entire disclosure of which is incorporated by reference herein.

Now that features of the invention and some embodiments of the invention have been described, Statements (non-limiting) of various embodiments of the invention are as follows:

Statement A: An apparatus for removing support material from and/or smoothing surfaces of an additively manufactured part, comprising:
  a chamber;
  a support surface within the chamber, and configured to support an additively manufactured part (the "AM part");
  one or more nozzles within the chamber, and configured for spraying a fluid at said AM part;
  a tank configured to hold a volume of said fluid, wherein the tank is positioned to capture the fluid after the fluid is sprayed at the part; and
  a diverter positioned in a flow path between the one or more nozzles and the tank.

Statement B: The apparatus of Statement A, wherein the diverter has a shallow conical shape.

Statement C: The apparatus of Statement A or Statement B, wherein the diverter is aligned so that the fluid being sprayed at the AM part impacts the diverter before the fluid reaches the tank.

Statement D: The apparatus of Statement A, Statement B, or Statement C, wherein the diverter comprises an umbrella that diverts fluid outward towards a peripheral edge thereof.

Statement E: The apparatus of Statement D wherein the peripheral edge of the umbrella is smaller than an upper open side of the tank, whereby fluid flowing off the umbrella falls over the peripheral edge into the upper open side of the tank.

Statement F: The apparatus of Statement D or Statement E further comprising, a mesh screen mounted between the umbrella and the tank, wherein the mesh screen extends beyond edges of the umbrella to capture solid material entrained in the fluid before entering the tank.

Statement G: The apparatus of Statement A, wherein the diverter comprises a diverter shield body that diverts fluid toward an opening in a center thereof.

Statement H: The apparatus of Statement G further comprising, a drain member that connects to the opening of the diverter shield body and extends to the tank which is positioned away from direct spraying of the fluid, wherein the drain member provides a flow path for the fluid from the diverter shield body to the tank.

Statement I: The apparatus of Statement G or H wherein the diverter comprises a bottom floor of the chamber.

Statement J: The apparatus of any of the foregoing Statements wherein the diverter comprises a slanted surface that reduces or prevents accumulation of fluid thereupon.

Statement K: A method of removing support material from and/or smoothing surfaces of an additively manufactured part, comprising:
  providing a chamber, a support surface within the chamber, one or more nozzles within the chamber, a tank beneath the one or more nozzles, and a diverter positioned between the one or more nozzles and the tank;
  placing an additively manufactured part (the "AM part") on the support surface;
  spraying a fluid from the one or more nozzles at the AM part, wherein at least a portion of the fluid impacts on the diverter after being sprayed at the AM part; and
  collecting the fluid in the tank.

Statement L: The method of Statement K wherein the fluid is collected in the tank so that the fluid can be reused for spraying at the AM part.

Statement M: The method of Statement K or Statement L further comprising:
  providing a mesh screen between the diverter and the tank; and
  collecting solid particles entrained in the fluid flowing off the diverter in the mesh screen.

Statement N: A method of reducing foaming in a process for removing support material from and/or smoothing surfaces of an additively manufactured part, comprising:
  providing a chamber, a support surface within the chamber, and one or more nozzles within the chamber, a tank beneath the one or more nozzles, and a diverter positioned between the one or more nozzles and the tank;
  placing an additively manufactured part (the "AM part") on the support surface;
  spraying a fluid from the one or more nozzles at the AM part;
  collecting sprayed fluid in the tank; and
  diverting forcefully sprayed fluid from directly impacting the fluid being collected in the tank, whereby foaming of the fluid in the tank is reduced.

Statement O: The method of Statement N further comprising:
  providing a mesh screen between the diverter and the tank; and
  collecting solid particles entrained in the fluid flowing off the diverter in the mesh screen.

Statement P: The method of Statement N or Statement O further comprising, pumping fluid collected in the tank back to the one or more nozzles so that the fluid can be sprayed at the AM part again.

Statement Q: The method of Statement N, Statement O, or Statement P, wherein the fluid is sprayed at the part at a high pressure.

Statement R: The method of Statement N, further comprising providing a drainage flow path from the diverter from the tank, which is located spaced away from the spraying of the fluid.

In the foregoing description, example embodiments are described. The specification and drawings are accordingly to be regarded in an illustrative rather than a restrictive sense.

It will be appreciated that various aspects of the above-disclosed invention and other features and functions, or alternatives thereof, may be desirably combined into many other different systems or applications. Various presently unforeseen or unanticipated alternatives, modifications, variations, and/or improvements therein may be subsequently made by those skilled in the art, and those alternatives, modifications, variations, and/or improvements are intended to be encompassed by the following claims.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

The invention claimed is:

1. An apparatus for removing support material from and/or smoothing surfaces of an additively manufactured part, comprising:
a chamber;
a support surface within the chamber, and configured to support an additively manufactured part (the "AM part");
one or more nozzles within the chamber, and configured for spraying a fluid at said AM part;
a tank configured to hold a volume of said fluid, wherein the tank is positioned to capture the fluid after the fluid is sprayed at the part; and
a diverter positioned in a flow path between the one or more nozzles and the tank.

2. The apparatus of claim 1 wherein the diverter has a shallow conical shape.

3. The apparatus of claim 1, wherein the diverter is aligned so that the fluid being sprayed at the AM part impacts the diverter before the fluid reaches the tank.

4. The apparatus of claim 1, wherein the diverter comprises an umbrella that diverts fluid outward towards a peripheral edge thereof.

5. The apparatus of claim 4 wherein the peripheral edge of the umbrella is smaller than an upper open side of the tank, whereby fluid flowing off the umbrella falls over the peripheral edge into the upper open side of the tank.

6. The apparatus of claim 4, further comprising a mesh screen mounted between the umbrella and the tank, wherein the mesh screen extends beyond edges of the umbrella to capture solid material entrained in the fluid before entering the tank.

7. The apparatus of claim 1 wherein the diverter comprises a diverter shield body that diverts fluid toward an opening in a center thereof.

8. The apparatus of claim 7 further comprising a drain member that connects to the opening of the diverter shield body and extends to the tank which is positioned away from direct spraying of the fluid, wherein the drain member provides a flow path for the fluid from the diverter shield body to the tank.

9. The apparatus of claim 1, wherein the diverter comprises a bottom floor of the chamber.

10. The apparatus of claim 1, wherein the diverter comprises a slanted surface that reduces or prevents accumulation of fluid thereupon.

11. A method of removing support material from and/or smoothing surfaces of an additively manufactured part, comprising:
providing a chamber, a support surface within the chamber, one or more nozzles within the chamber, a tank beneath the one or more nozzles, and a diverter positioned between the one or more nozzles and the tank;
placing an additively manufactured part (the "AM part") on the support surface;
spraying a fluid from the one or more nozzles at the AM part, wherein at least a portion of the fluid impacts on the diverter after being sprayed at the AM part; and
collecting the fluid in the tank.

12. The method of claim 11 wherein the fluid is collected in the tank so that the fluid can be reused for spraying at the AM part.

13. The method of claim 11 further comprising:
providing a mesh screen between the diverter and the tank; and
collecting solid particles entrained in the fluid flowing off the diverter in the mesh screen.

14. A method of reducing foaming in a process for removing support material from and/or smoothing surfaces of an additively manufactured part, comprising:
providing a chamber, a support surface within the chamber, and one or more nozzles within the chamber, a tank beneath the one or more nozzles, and a diverter positioned between the one or more nozzles and the tank;
placing an additively manufactured part (the "AM part") on the support surface;
spraying a fluid from the one or more nozzles at the AM part;
collecting sprayed fluid in the tank; and
diverting forcefully sprayed fluid from directly impacting the fluid being collected in the tank, whereby foaming of the fluid in the tank is reduced.

15. The method of claim 14, further comprising:
providing a mesh screen between the diverter and the tank; and
collecting solid particles entrained in the fluid flowing off the diverter in the mesh screen.

16. The method of claim 14, further comprising pumping fluid collected in the tank back to the one or more nozzles so that the fluid can be sprayed at the AM part again.

17. The method of claim 14, wherein the fluid is sprayed at the part at a high pressure.

18. The method of claim 14, wherein the one or more nozzles are oriented downward toward the support surface.

19. The method of claim 14, wherein the support surface has one or more openings sized and configured to allow the fluid to pass through the support surface onto the diverter.

* * * * *